(12) United States Patent
Lim et al.

(10) Patent No.: US 12,606,259 B2
(45) Date of Patent: Apr. 21, 2026

(54) WHEEL AND MOVING OBJECT INCLUDING THE SAME

(71) Applicants: Hyundai Motor Company, Seoul (KR); Kia Corporation, Seoul (KR)

(72) Inventors: Hyun Seop Lim, Anyang-si (KR); Ju Young Yoon, Suwon-si (KR); Kyu Jung Kim, Seoul (KR); Beom Su Kim, Yongin-si (KR); Ho Jun Kim, Gunpo-si (KR); Dong Jin Hyun, Suwon-si (KR); Dong Hyun Lee, Ansan-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 629 days.

(21) Appl. No.: 18/155,418

(22) Filed: Jan. 17, 2023

(65) Prior Publication Data

US 2024/0051627 A1 Feb. 15, 2024

(30) Foreign Application Priority Data

Aug. 11, 2022 (KR) ........................ 10-2022-0100931

(51) Int. Cl.
| | |
|---|---|
| *B62D 57/02* | (2006.01) |
| *B60B 19/02* | (2006.01) |
| *B60B 19/04* | (2006.01) |

(52) U.S. Cl.
CPC ............ *B62D 57/022* (2013.01); *B60B 19/02* (2013.01); *B60B 19/04* (2013.01)

(58) Field of Classification Search
CPC ................................................. B62D 57/022
See application file for complete search history.

(56) References Cited

U.S. PATENT DOCUMENTS

| | | | | |
|---|---|---|---|---|
| 7,017,687 B1 * | 3/2006 | Jacobsen | .............. | B62D 57/028 |
| | | | | 280/5.2 |
| 9,878,576 B2 * | 1/2018 | Hein | ........................ | B60B 19/04 |
| 12,195,117 B2 * | 1/2025 | Mire | .................... | B62D 57/032 |
| 2012/0319457 A1 | 12/2012 | Jo | | |
| 2022/0097450 A1 | 3/2022 | Kim et al. | | |
| 2024/0109365 A1 * | 4/2024 | Ha | .......................... | B60B 19/00 |
| 2024/0239136 A1 * | 7/2024 | Ha | .......................... | B60B 19/04 |

FOREIGN PATENT DOCUMENTS

| | | | | |
|---|---|---|---|---|
| CN | 101844483 B | 7/2011 | | |
| DE | 102021208839 A1 * | 6/2022 | .............. | A61G 5/06 |
| JP | 5413771 B2 * | 2/2014 | | |
| JP | 5467423 B2 | 4/2014 | | |
| KR | 20100031168 A | 3/2010 | | |
| KR | 20100088262 A | 8/2010 | | |
| KR | 20110117489 A | 10/2011 | | |
| KR | 20110132745 A | 12/2011 | | |
| KR | 20120053236 A * | 5/2012 | .............. | B25J 5/007 |
| KR | 102139500 B1 | 7/2020 | | |
| KR | 20230020849 A * | 2/2023 | ............ | B60B 23/02 |

* cited by examiner

*Primary Examiner* — Kevin Hurley

(74) *Attorney, Agent, or Firm* — Slater Matsil, LLP

(57) ABSTRACT

An embodiment wheel includes a wheel frame unit including a plurality of peripheral regions, a driving power unit disposed at a first side of the wheel frame unit and configured to provide a rotational force that allows the wheel frame unit to perform a rotational motion about a central axis, and a walking power unit disposed at the first side of the wheel frame unit and configured to provide power that changes relative positions between the plurality of peripheral regions.

20 Claims, 8 Drawing Sheets

1

1

WHEEL AND MOVING OBJECT INCLUDING THE SAME

CROSS-REFERENCE TO RELATED APPLICATIONS

This application claims the benefit of Korean Patent Application No. 10-2022-0100931, filed on Aug. 11, 2022, which application is hereby incorporated herein by reference.

TECHNICAL FIELD

The present disclosure relates to a wheel and a moving object including the same.

BACKGROUND

Mobile robots are broadly classified into a foot-type robot capable of performing a walking motion by using structures each provided in the form of a leg, and a wheel-type robot capable of performing a driving motion by using wheels. The advantage of the foot-type robot is that the foot-type robot may easily overcome environments such as stairs or rugged areas. However, the foot-type robot has problems in that a movement speed is low on a flat ground surface, and energy consumption efficiency deteriorates. In contrast, the advantage of the wheel-type robot is that a movement speed is high on a flat ground surface, and energy consumption efficiency is high. However, the wheel-type robot has a problem in that driving performance significantly deteriorates in environments such as stairs or rugged areas. To solve the problem with the foot-type robot and the problem with the wheel-type robot, the development is being conducted on a robot implemented by combining the advantages of the two types of robots. For example, in the related art, studies are being performed on i) a type in which a wheel is attached to a structure having a leg shape provided on a foot-type robot or ii) a type in which a shape of a wheel provided on a wheel-type robot is temporarily deformed to overcome an obstacle such as stairs.

However, in the case of type i), there is a problem in that a size of the wheel to be attached to the structure having the leg is limited, and a load is applied, by the wheel, to a joint region formed on the structure having the leg shape, which adversely affects durability of the robot. In addition, in the case of type ii), because the shape of the wheel is temporarily deformed to correspond to a shape of an obstacle such as stairs, there is a problem in that the robot cannot pass over an obstacle having a relatively large height.

SUMMARY

The present disclosure relates to a wheel and a moving object including the same. Particular embodiments relate to a wheel deformable in shape and a moving object including the same.

Embodiments of the present disclosure provide a wheel capable of being used for a new type of moving object implemented by combining an advantage of a foot-type robot and an advantage of a wheel-type robot, and a moving object capable of not only driving on a flat ground surface at high speed and but also performing a walking motion for passing over an obstacle.

An exemplary embodiment of the present disclosure provides a wheel including a wheel frame unit including a plurality of peripheral regions, a driving power unit disposed at one side of the wheel frame unit and configured to provide a rotational force that allows the wheel frame unit to perform a rotational motion about a central axis, and a walking power unit disposed at one side of the wheel frame unit and configured to provide power that changes relative positions between the plurality of peripheral regions, in which the wheel frame unit may further include extension regions each having one side coupled to the walking power unit and extending from one side thereof in a radial direction of the wheel frame unit, and in which the peripheral regions include first peripheral regions each having one side fixedly coupled to the extension region and second peripheral regions each having one side rotatably coupled to the extension region or the first peripheral region.

The second peripheral region may be coupled to the extension region or the first peripheral region and configured to be rotatable about a rotation axis defined in a direction intersecting the radial direction.

One side of the extension region may be coupled to the walking power unit on the central axis, and the walking power unit may rotate the extension region about the central axis.

The extension regions may include first and second extension regions provided separately, one side of the first extension region and one side of the second extension region may be coupled to the walking power unit on the central axis, and the walking power unit may rotate the first and second extension regions in opposite directions about the central axis.

The first peripheral regions may include a first-first peripheral region having a shape of an arc and fixedly coupled to the first extension region and a first-second peripheral region having a shape of an arc and fixedly coupled to the second extension region.

The first extension region and the first-first peripheral region may be integrated, and the second extension region and the first-second peripheral region may be integrated.

The second peripheral regions may include a second-first peripheral region having a shape of an arc and rotatably coupled to the first extension region or the first-first peripheral region and a second-second peripheral region having a shape of an arc and rotatably coupled to the second extension region or the second-first peripheral region.

A region of the second-first peripheral region, which is rotatably coupled to the first extension region or the first-first peripheral region, may be defined within a width of the first extension region in a circumferential direction, and a region of the second-second peripheral region, which is rotatably coupled to the second extension region or the first-second peripheral region, may be defined within a width of the second extension region in the circumferential direction.

The peripheral regions may further include a third peripheral region having a shape of an arc and configured such that the second-first peripheral region and the second-second peripheral region are rotatably coupled to the third peripheral region.

A combination of the first-first peripheral region, the first-second peripheral region, the second-first peripheral region, the second-second peripheral region, and the third peripheral region may correspond to a predetermined circular shape.

The first extension region and the second extension region may have shapes corresponding to each other when the wheel frame unit is viewed in a direction in which the central axis extends.

The first-first peripheral region and the first-second peripheral region may have shapes corresponding to each other when the wheel frame unit is viewed in a direction in which the central axis A extends.

The second-first peripheral region and the second-second peripheral region may have shapes corresponding to each other when the wheel frame unit is viewed in a direction in which the central axis extends.

A region, in which the second-first peripheral region is rotatably coupled to the third peripheral region, and a region, in which the second-second peripheral region is rotatably coupled to the third peripheral region, may overlap each other when the wheel frame unit is viewed in a direction in which the central axis extends.

A sum of a central angle of the arc of the first-first peripheral region and a central angle of the arc of the first-second peripheral region may correspond to 180 degrees, and a sum of a central angle of the arc of the second-first peripheral region, a central angle of the arc of the second-second peripheral region, and a central angle of the arc of the third peripheral region may correspond to 180 degrees.

The driving power unit may be spaced apart from the wheel frame unit in a direction in which the central axis extends, and the walking power unit may be disposed between the wheel frame unit and the driving power unit.

The driving power unit may include a central driving shaft disposed on the same axis as the central axis and configured to rotate, and the walking power unit may be relatively fixed and coupled to the central driving shaft.

The walking power unit may include a central walking shaft disposed on the same axis as the central axis, configured to rotate, and relatively fixed and coupled to the central driving shaft, and a differential gear coupled to one side of the central walking shaft, one side of the first extension region may be coupled to one side of the differential gear, and one side of the second extension region may be coupled to the other side of the differential gear.

Another exemplary embodiment of the present disclosure provides a moving object including a wheel and a body unit on which the wheel is mounted, in which the wheel includes a wheel frame unit including a plurality of peripheral regions, a driving power unit disposed at one side of the wheel frame unit and configured to provide a rotational force that allows the wheel frame unit to perform a rotational motion about a central axis, and a walking power unit disposed at one side of the wheel frame unit and configured to provide power that changes relative positions between the plurality of peripheral regions, in which the wheel frame unit may further include extension regions each having one side coupled to the walking power unit and extending from one side thereof in a radial direction of the wheel frame unit, and in which the peripheral regions include first peripheral regions each having one side fixedly coupled to the extension region and second peripheral regions each having one side rotatably coupled to the extension region or the first peripheral region.

According to embodiments of the present disclosure, it is possible to provide the wheel capable of being used for the new type of moving object implemented by combining the advantage of the foot-type robot and the advantage of the wheel-type robot, and the moving object capable of not only driving on a flat ground surface at high speed and but also performing a walking motion for passing over an obstacle.

DETAILED DESCRIPTION OF ILLUSTRATIVE EMBODIMENTS

Hereinafter, a wheel and moving object according to embodiments of the present disclosure will be described with reference to the drawings.

Wheel

Figure 1:
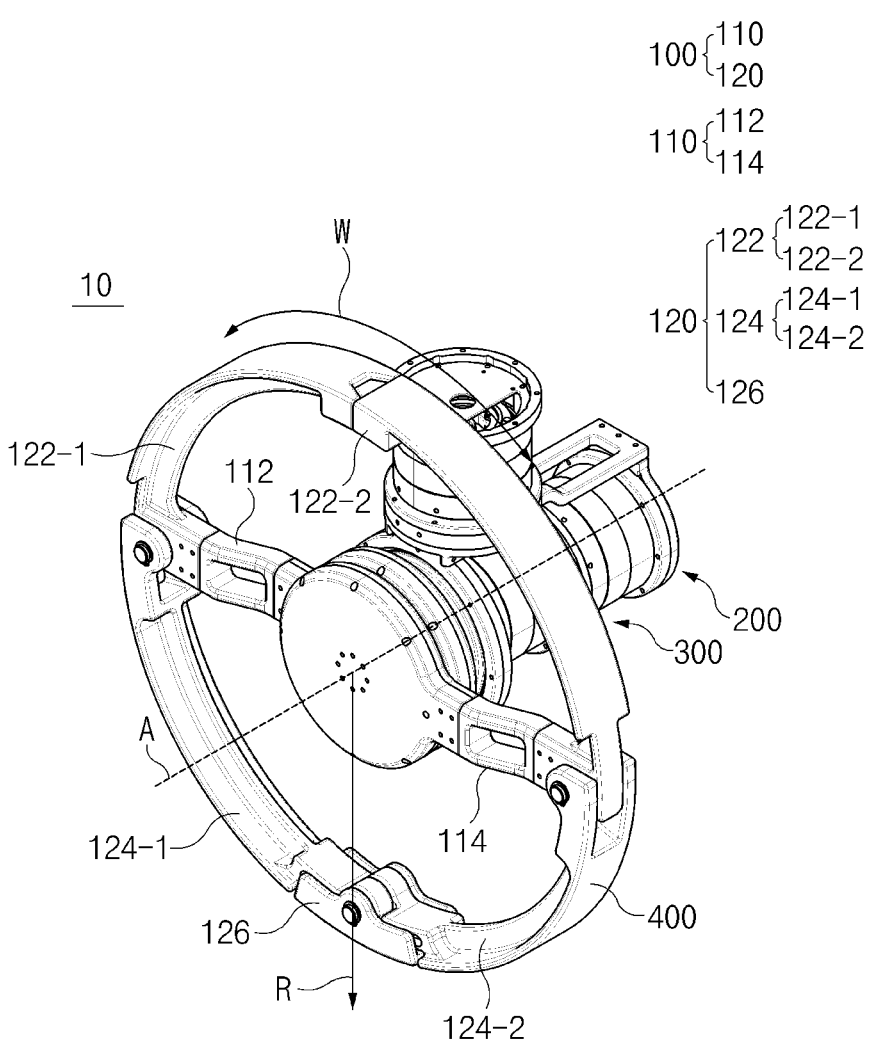
FIG. 1 is a perspective view illustrating a wheel according to an embodiment of the present disclosure.
Figure 2:
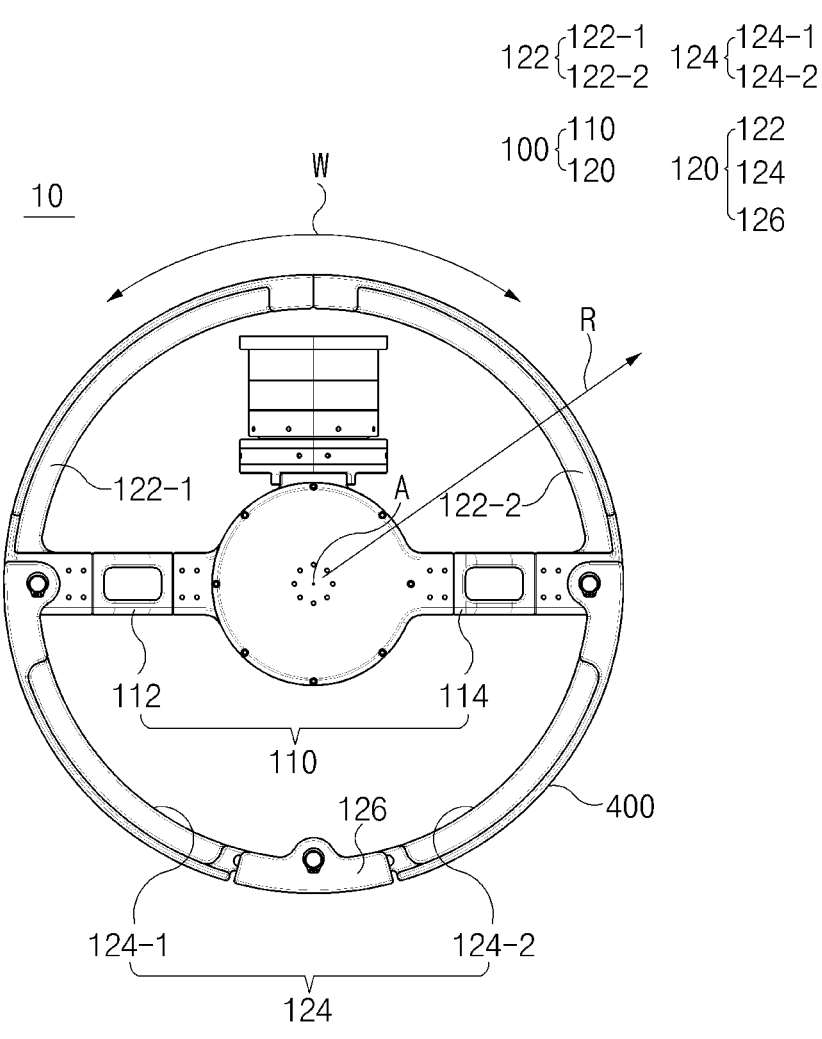
FIG. 2 is a view illustrating a shape of the wheel according to an embodiment of the present disclosure when the wheel moves while performing a rotational motion.
Figure 3:
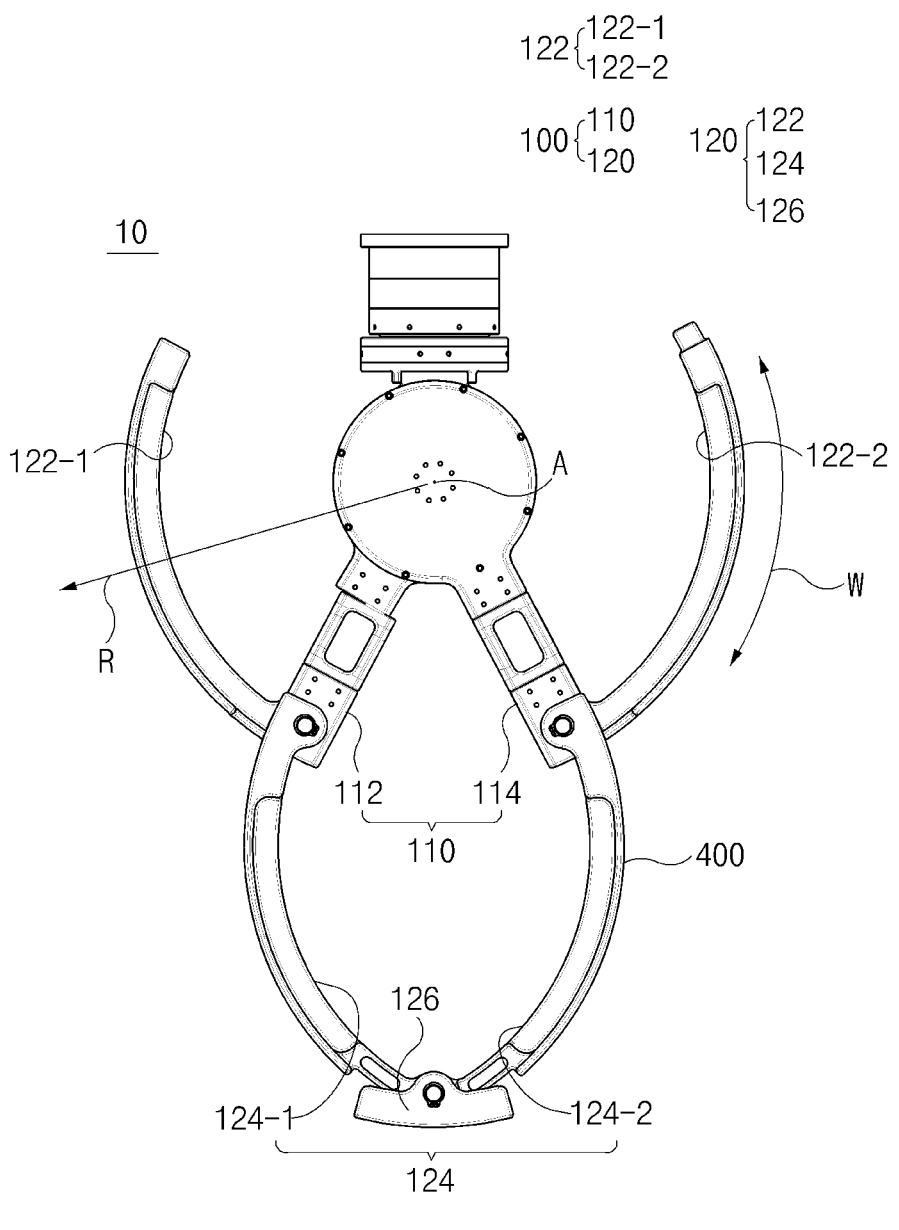
FIG. 3 is a view illustrating a shape of the wheel according to an embodiment of the present disclosure when the wheel moves while performing a walking motion.

FIG. 1 is a perspective view illustrating a wheel according to an embodiment of the present disclosure, and FIG. 2 is a view illustrating a shape of the wheel according to an embodiment of the present disclosure when the wheel moves while performing a rotational motion. FIG. 3 is a view illustrating a shape of the wheel according to an embodiment of the present disclosure when the wheel moves while performing a walking motion.

A wheel 10 according to an embodiment of the present disclosure may be configured to be mounted on various mobilities. In particular, as described below, when the wheel 10 according to embodiments of the present disclosure travels on a flat ground surface, the wheel 10 may travel while performing a rotational motion about a central axis A in the same way as a general wheel having a circular shape. When the wheel 10 passes over stepped portions such as stairs, the wheel 10 may move while performing a walking motion similar to a walking motion of a person. To achieve the above-mentioned feature, the wheel 10 according to embodiments of the present disclosure may have a structure deformable in shape.

As illustrated in FIGS. 1 to 3, the wheel 10 according to embodiments of the present disclosure may include a wheel frame unit 100 including a plurality of peripheral regions 120 each having a shape of an arc. The plurality of peripheral regions 120 may correspond to a predetermined circular shape when combined with one another. It can be understood that the combined plurality of peripheral regions 120 is similar in shape to a general wheel in the related art. Meanwhile, the wheel frame unit 100 may be configured to perform the rotational motion about the central axis A.

In this case, the wheel 10 may further include a driving power unit 200 disposed at one side of the wheel frame unit 100 and configured to provide a rotational force that allows the wheel frame unit 100 to perform the rotational motion about the central axis A. More specifically, the driving power unit 200 may include a driving motor 200a and a central driving shaft 210 coupled to the driving motor 200a and configured to rotate. Because the wheel frame unit 100 may perform the rotational motion by receiving power from the driving power unit 200, the wheel may travel in the same way as a general wheel on a flat ground surface or a ground surface having comparatively gradual unevenness. However, the configuration in which the wheel frame unit 100 performs the rotational motion by receiving power from the driving power unit 200 does not mean that the wheel frame unit 100 is connected directly to the driving power unit 200. As described below, the wheel frame unit 100 may perform the rotational motion by indirectly receiving power from the driving power unit 200 through another component (i.e., a walking power unit).

The wheel 10 may further include a walking power unit 300 disposed at one side of the wheel frame unit 100 and configured to provide power that changes relative positions between the plurality of peripheral regions 120. The walking power unit 300 may be configured to change the relative positions between the plurality of peripheral regions 120, thereby providing power required to change a shape of the wheel frame unit 100. More specifically, in case that the wheel 10 is intended to pass over stepped portions such as stairs, the walking power unit 300 may change the relative positions between the plurality of peripheral regions 120 so that the wheel frame unit 100 has a shape suitable for implementing the walking motion similar to a walking motion of a person. On the contrary, in case that the wheel 10 is intended to perform the driving motion on a flat ground surface or a ground surface having comparatively gradual unevenness, the walking power unit 300 may change the relative positions between the plurality of peripheral regions 120 so that the wheel frame unit 100 is identical in shape to a general wheel.

Meanwhile, in embodiments described in the present specification, a radial direction R and a circumferential direction W of the wheel frame unit 100 will be described based on a state in which the wheel frame unit 100 is similar in shape to a general wheel.

Meanwhile, in addition to the peripheral regions 120, the wheel frame unit 100 may further include extension regions no each having one side coupled to the walking power unit 300 and extending from one side thereof in the radial direction R of the wheel frame unit 100. More particularly, one side of the extension region no may be coupled to the walking power unit 300 on the central axis A of the wheel frame unit 100, and the walking power unit 300 may rotate the extension region no about the central axis A. Meanwhile, in embodiments described in the present specification, the central axis A of the wheel frame unit 100 may be understood as an imaginary axis instead of a component that actually exists.

In addition, the peripheral regions 120 may include first peripheral regions 122 each having a shape of an arc and fixedly coupled to the extension region no and second peripheral regions 124 each having a shape of an arc and one side rotatably coupled to the extension region no or the first peripheral region 122. Therefore, according to embodiments of the present disclosure, when the extension regions no are rotated about the central axis A by an operation of the walking power unit 300, the first peripheral regions 122 fixedly coupled to the extension regions no also rotate about the central axis A. In contrast, the second peripheral regions 124 rotate about regions coupled to the extension regions no or the first peripheral regions 122, such that the second peripheral regions 124 move relative to the extension regions no and the first peripheral regions 122. Therefore, the wheel frame unit 100 may be deformed in shape (see FIGS. 2 and 3).

More particularly, the second peripheral regions 124 may be coupled to the extension regions no or the first peripheral regions 122 and configured to be rotatable about rotation axes defined in a direction intersecting the radial direction R of the wheel frame unit 100. For example, the central axis A and the rotation center axis of the second peripheral region 124 may be defined in parallel with the ground surface.

Meanwhile, as illustrated in FIGS. 2 and 3, the extension regions no may include a first extension region 112 and a second extension region 114. The first and second extension regions 112 and 114 may be coupled to the walking power unit 300 on the central axis A of the wheel frame unit 100, and the walking power unit 300 may rotate the first and second extension regions 112 and 114 in opposite directions about the central axis A. Therefore, as illustrated in FIGS. 2 and 3, when the walking power unit 300 operates, the first and second extension regions 112 and 114 may rotate away from or toward each other, such that the wheel frame unit 100 may be changed in shape. Meanwhile, in an exemplary embodiment, a length of the first extension region 112 in the radial direction R and a length of the second extension region 114 in the radial direction R may correspond to each other. As illustrated in FIGS. 2 and 3, it can be understood that the first and second extension regions 112 and 114 have shapes corresponding to each other when the wheel frame unit 100 is viewed in a direction in which the central axis A extends.

Referring to FIGS. 1 to 3, the first peripheral regions 122 may include a first-first peripheral region 122-1 having a shape of an arc and fixedly coupled to the first extension region 112 and a first-second peripheral region 122-2 having a shape of an arc and fixedly coupled to the second extension region 114. More specifically, the first-first peripheral region 122-1 may have a shape of an arc extending clockwise from an end of the first extension region 112 based on the radial direction R. The first-second peripheral region 122-2 may have a shape of an arc extending counterclockwise from an end of the second extension region 114 based on the radial direction R. In addition, a central angle of the arc of the first-first peripheral region 122-1 and a central angle of the arc of the first-second peripheral region 122-2 may correspond to each other, and radii of curvature of the two arcs may also correspond to each other. As illustrated in FIGS. 2 and 3, it can be understood that the first-first peripheral region 122-1 and the first-second peripheral region 122-2 have shapes corresponding to each other when the wheel frame unit 100 is viewed in the direction in which the central axis A extends.

In addition, for example, the first extension region 112 and the first-first peripheral region 122-1 may be integrated, and the second extension region 114 and the first-second peripheral region 122-2 may be integrated. In this case, the configuration in which the two components are integrated may mean that the two components are indivisibly coupled to each other to the extent that the two components cannot be separated unless the two components are irreversibly destroyed.

Referring to FIGS. 2 and 3, the second peripheral regions 124 may include a second-first peripheral region 124-1 having a shape of an arc and rotatably coupled to the first extension region 112 or the first-first peripheral region 122-1, and a second-second peripheral region 124-2 having a shape of an arc and rotatably coupled to the second extension region 114 or the first-second peripheral region 122-2. More specifically, in the state in which the peripheral regions 120 are combined so that the wheel frame unit 100 has a circular shape, the second-first peripheral region 124-1 may have a shape of an arc extending counterclockwise from the region in which the first extension region 112 and the first-first peripheral region 122-1 are connected, and the second-second peripheral region 124-2 may have a shape of an arc extending clockwise from the region in which the second extension region 114 and the first-second peripheral region 122-2 are connected. In addition, a central angle of the arc of the second-first peripheral region 124-1 and a central angle of the arc of the second-second peripheral region 124-2 may correspond to each other, and radii of curvature of the two arcs may also correspond to each other. As illustrated in FIGS. 2 and 3, it can be understood that the second-first peripheral region 124-1 and the second-second peripheral region 124-2 have shapes corresponding to each other when the wheel frame unit 100 is viewed in the direction in which the central axis A extends.

Meanwhile, for example, as illustrated in FIGS. 2 and 3, the region of the second-first peripheral region 124-1, which is rotatably coupled to the first extension region 112 or the first-first peripheral region 122-1, may be defined within a width of the first extension region 112 in the circumferential direction W, and the region of the second-second peripheral region 124-2, which is rotatably coupled to the second extension region 114 or the first-second peripheral region 122-2, may be defined within a width of the second extension region 114 in the circumferential direction W.

Meanwhile, as illustrated in FIGS. 2 and 3, the peripheral regions 120 of the wheel frame unit 100 may further include a third peripheral region 126 having a shape of an arc and configured such that the second-first peripheral region 124-1 and the second-second peripheral region 124-2 are rotatably coupled to the third peripheral region 126. The third peripheral region 126 may serve as a human foot and come into contact with the ground surface when the wheel 10 performs the walking motion. For example, the wheel frame unit 100 may have a symmetric shape in the radial direction R with respect to the third peripheral region 126.

Referring to the above-mentioned description, the combination of the first-first peripheral region 122-1, the first-second peripheral region 122-2, the second-first peripheral region 124-1, the second-second peripheral region 124-2, and the third peripheral region 126 may correspond to a predetermined circular shape. It can be understood that a sum of the central angle of the arc of the first-first peripheral region 122-1, the central angle of the arc of the first-second peripheral region 122-2, the central angle of the arc of the second-first peripheral region 124-1, the central angle of the arc of the second-second peripheral region 124-2, and the central angle of the arc of the third peripheral region 126 corresponds to 360 degrees, and the radius of curvature of the arc of the first-first peripheral region 122-1, the radius of curvature of the arc of the first-second peripheral region 122-2, the radius of curvature of the arc of the second-first peripheral region 124-1, the radius of curvature of the arc of the second-second peripheral region 124-2, and the radius of curvature of the arc of the third peripheral region 126 correspond to one another.

In addition, as illustrated in FIGS. 2 and 3, the region in which the second-first peripheral region 124-1 is rotatably coupled to the third peripheral region 126 and the region in which the second-second peripheral region 124-2 is rotatably coupled to the third peripheral region 126 may overlap each other when the wheel frame unit 100 is viewed in the direction in which the central axis A extends. More particularly, the region in which the second-first peripheral region 124-1 is rotatably coupled to the third peripheral region 126 and the region in which the second-second peripheral region 124-2 is rotatably coupled to the third peripheral region 126 may be defined on the same axis. This may be to allow the wheel frame unit 100 to have a symmetric shape with respect to the third peripheral region 126 when the shape of the wheel frame unit 100 is deformed as the first and second extension regions 112 and 114 are rotated by the walking power unit 300.

Meanwhile, for example, as illustrated in FIG. 2, when the plurality of peripheral regions 120 is combined so that the wheel frame unit 100 has the circular shape, an angle defined between the first and second extension regions 112 and 114 may be approximately 180 degrees. In this case, a sum of the central angle of the arc of the first-first peripheral region 122-1 and the central angle of the arc of the first-second peripheral region 122-2 may correspond to 180 degrees, and a sum of the central angle of the arc of the second-first peripheral region 124-1, the central angle of the arc of the second-second peripheral region 124-2, and the central angle of the arc of the third peripheral region 126 may correspond to 180 degrees. More specifically, the central angle of the arc of the second-first peripheral region 124-1 and the central angle of the arc of the second-second peripheral region 124-2 may be larger than the central angle of the arc of the third peripheral region 126. This may be to enable the wheel 10 to pass over a high stair or stepped portion by maximizing a length of the wheel frame unit 100 when the wheel frame unit 100 is deformed so that the wheel 10 may perform the walking motion, as illustrated in FIG. 3.

Figure 4:
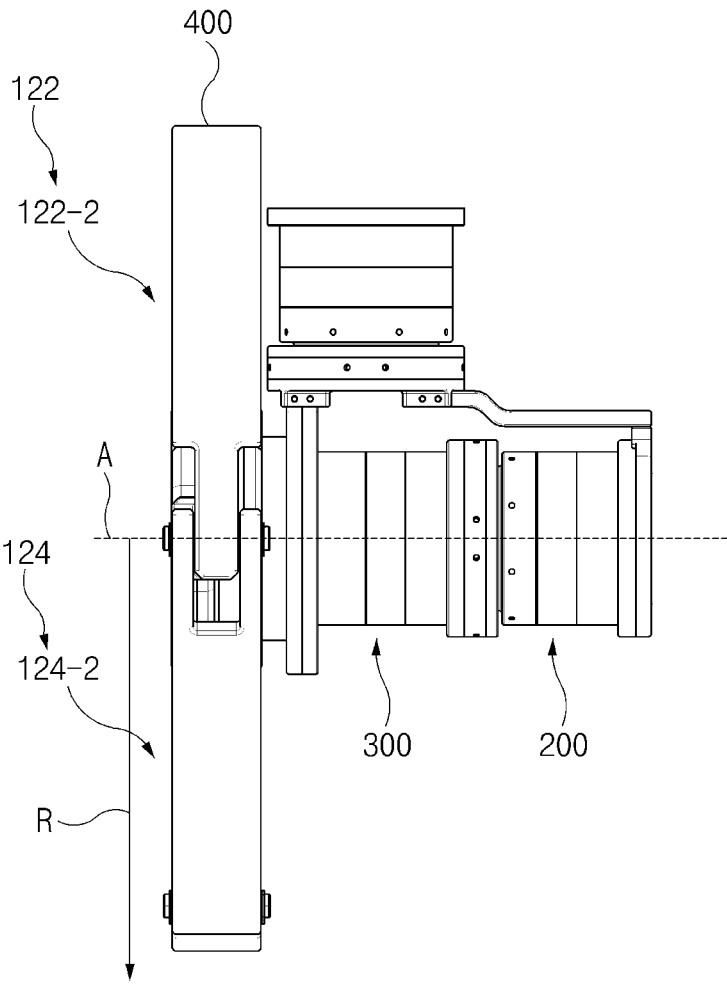
FIG. 4 is a side view illustrating the wheel according to an embodiment of the present disclosure.
Figure 5:
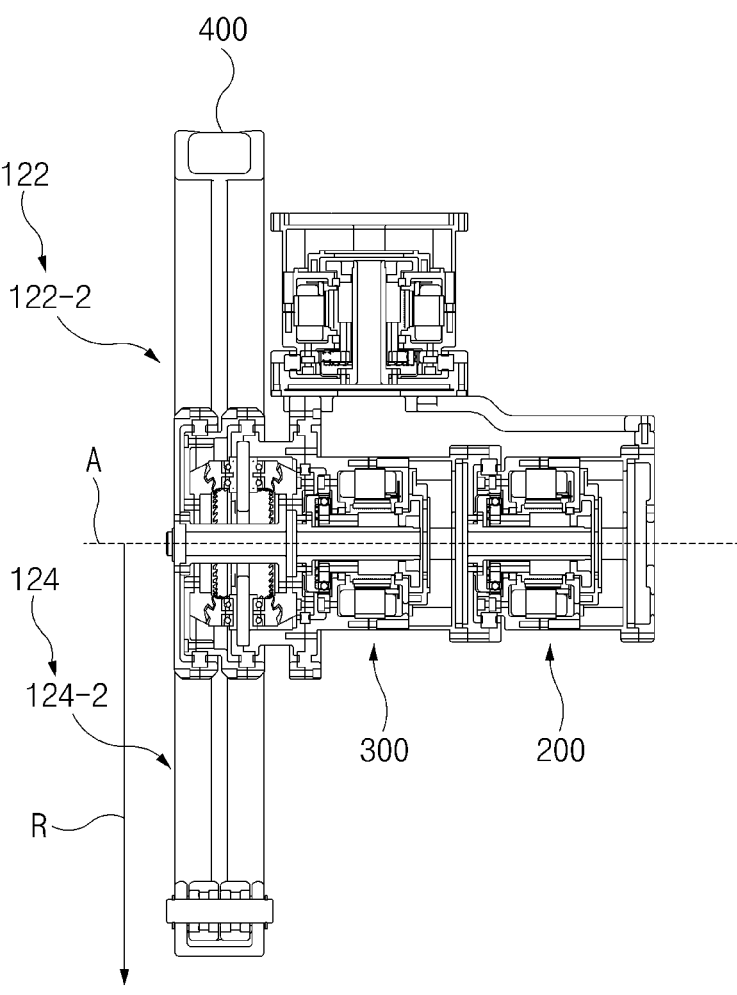
FIG. 5 is a vertical cross-sectional view illustrating the wheel according to an embodiment of the present disclosure.
Figure 6:
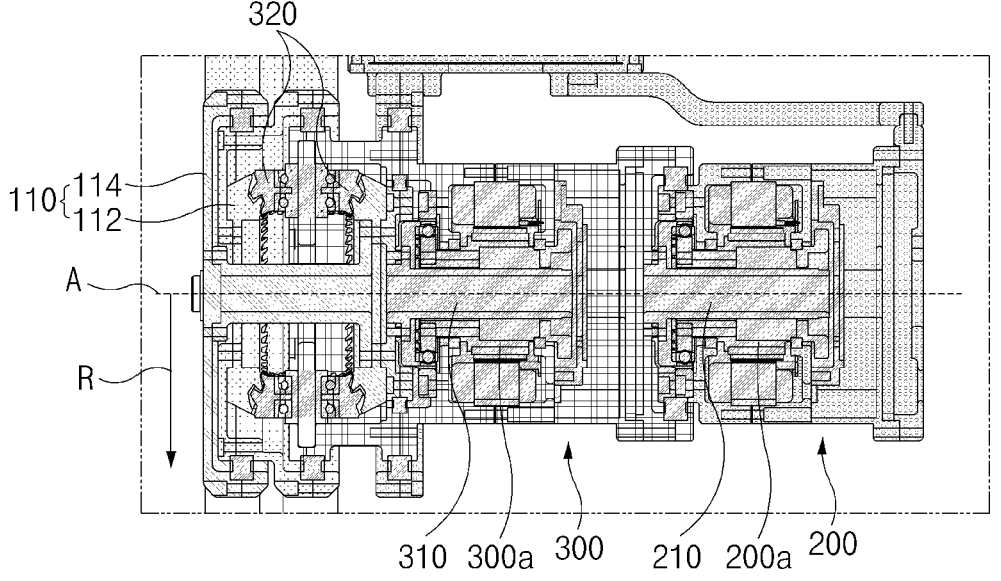
FIG. 6 is an enlarged vertical cross-sectional view of a coupling structure between a driving power unit and a walking power unit of the wheel according to an embodiment of the present disclosure.

FIG. 4 is a side view illustrating the wheel according to an embodiment of the present disclosure, and FIG. 5 is a vertical cross-sectional view illustrating the wheel according to an embodiment of the present disclosure. FIG. 6 is an enlarged vertical cross-sectional view of a coupling structure between the driving power unit and the walking power unit of the wheel according to an embodiment of the present disclosure.

Meanwhile, the driving power unit 200 may be spaced apart from the wheel frame unit 100 in the direction in which the central axis A extends, and the walking power unit 300 may be disposed between the wheel frame unit 100 and the driving power unit 200.

More specifically, the walking power unit 300 may be relatively fixed and coupled to the central driving shaft 210 provided in the driving power unit 200, disposed on the same axis as the central axis A, and configured to rotate. In this case, it can be interpreted that the configuration in which the walking power unit 300 is relatively fixed and coupled to the central driving shaft 210 includes not only a case in which the walking power unit 300 is connected directly to the central driving shaft 210 but also a case in which the walking power unit 300 is connected indirectly to the central driving shaft 210 by means of another component. Therefore, according to an embodiment of the present disclosure, when the central driving shaft 210 of the driving power unit 200 rotates, the walking power unit 300 may also rotate, and the wheel frame unit 100 coupled to the walking power unit 300 may perform the rotational motion about the central axis A.

Furthermore, when the driving power unit 200 operates in the state in which the wheel frame unit 100 is deformed to have the shape illustrated in FIG. 3 so that the wheel 10 may pass over the stepped portions such as stairs, the wheel frame unit 100 performs the rotational motion about the central axis A. Therefore, it is possible to implement a motion similar to a pendulum motion of a person's leg that occurs when the person walks. For example, when the wheel 10 is intended to pass over a stair protruding upward, i) the driving power unit 200 operates, in the state in which the wheel frame unit 100 is deformed as illustrated in FIG. 3, so that the wheel frame unit 100 is rotated forward and the third peripheral region of the wheel frame unit 100 is supported on the stair, and then ii) the driving power unit 200 operates so that the wheel frame unit 100 is rotated rearward, which makes it possible to implement the walking motion in which the wheel climbs the stair.

In addition, the walking power unit 300 may include a central walking shaft 310 disposed on the same axis as the central axis A, configured to be rotatable, and relatively fixed and coupled to the central driving shaft 210, a walking motor 300a configured to rotate the central walking shaft 310, and a differential gear 320 coupled to one side of the central walking shaft 310. In this case, one side of the first extension region 112 may be coupled to one side of the differential gear 320, and one side of the second extension region 114 may be coupled to the other side of the differential gear 320. Therefore, when the central walking shaft 310 is rotated by the walking power unit 300, a rotational force of the central walking shaft 310 is transferred to the first and second extension regions 112 and 114 through the differential gear 320. A rotation direction of the first extension region 112, which receives power from the differential gear 320, and a rotation direction of the second extension region 114, which receives power from the differential gear 320, may be opposite to each other. Therefore, according to embodiments of the present disclosure, it is possible to simultaneously rotate the first and second extension regions 112 and 114 by means of the differential gear 320 without separately providing a power source for rotating the first and second extension regions 112 and 114. The description of the operational principle and structure of the differential gear may be replaced with the contents disclosed in the related art.

Referring to FIG. 1, the wheel 10 according to embodiments of the present disclosure may further include a surrounding member 400 attached to an outer portion of the wheel frame unit 100 based on the radial direction R. The surrounding member 400 may be configured to protect the wheel frame unit 100. The surrounding member 400 may be a component corresponding to a tire member of a wheel in the related art. The surrounding member 400 may be fixedly coupled to outer surfaces, based on the radial direction R, of the first-first peripheral region 122-1, the first-second peripheral region 122-2, the second-first peripheral region 124-1, the second-second peripheral region 124-2, and the third peripheral region 126. For example, the surrounding member 400 may include a rubber material reversibly deformable in shape. However, the material of the surrounding member 400 is not limited thereto.

Moving Object

Figure 7:
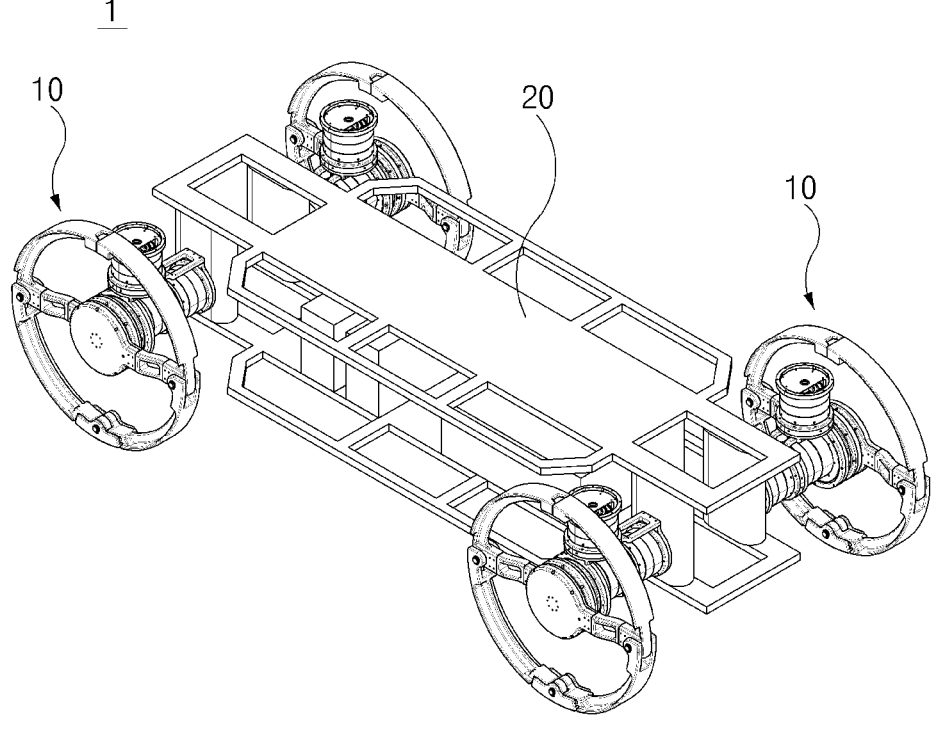
FIG. 7 is a perspective view illustrating a state in which a moving object according to an embodiment of the present disclosure is moved by the rotational motions of the wheels.
Figure 8:
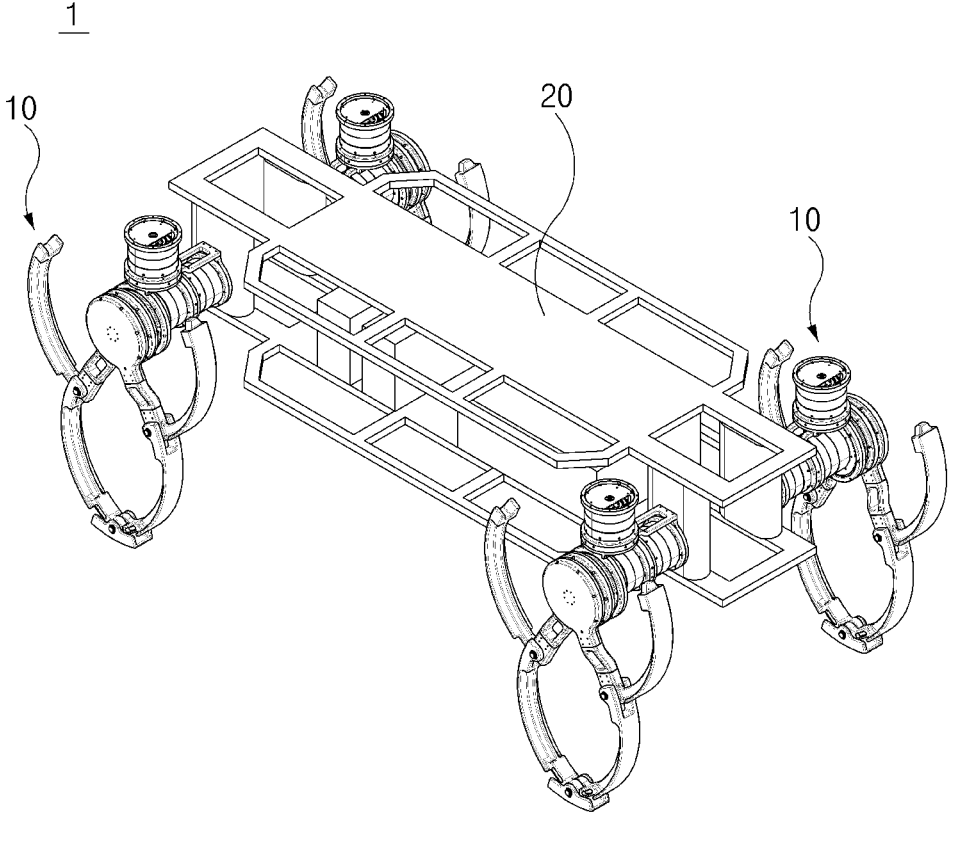
FIG. 8 is a perspective view illustrating a state in which the moving object according to an embodiment of the present disclosure is moved by the walking motions of the wheels.

FIG. 7 is a perspective view illustrating a state in which a moving object according to embodiments of the present disclosure is moved by the rotational motions of the wheels, and FIG. 8 is a perspective view illustrating a state in which the moving object according to embodiments of the present disclosure is moved by the walking motions of the wheels.

A moving object 1 according to embodiments of the present disclosure may include a plurality of the wheels 10, and a body unit 20 on which the wheels 10 are mounted. For example, as illustrated in FIGS. 7 and 8, two wheels 10 may be provided at each of the front and rear sides of the body unit 20.

The wheel 10 may include the wheel frame unit 100 including the plurality of peripheral regions 120 each having a shape of an arc, the driving power unit 200 disposed at one side of the wheel frame unit 100 and configured to provide the rotational force that allows the wheel frame unit 100 to perform the rotational motion about the central axis A, and the walking power unit 300 disposed at one side of the wheel frame unit 100 and configured to provide the power that changes the relative positions between the plurality of peripheral regions 120.

In addition, the wheel frame unit 100 may further include the extension regions no each having one side coupled to the walking power unit 300 and extending from one side thereof in the radial direction R of the wheel frame unit boo.

In addition, the peripheral regions 120 may include the first peripheral regions 122 each having a shape of an arc and one side fixedly coupled to the extension region no and the second peripheral regions 124 each having a shape of an arc and one side rotatably coupled to the extension region no or the first peripheral region 122. Meanwhile, the above-mentioned description of the wheel according to embodiments of the present disclosure may also be equally applied to the wheel provided on the moving object according to embodiments of the present disclosure.

In case that the moving object 1 according to embodiments of the present disclosure travels on a flat ground surface or a ground surface having comparatively gradual unevenness, the wheel frame unit 100 of the wheel 10 has a predetermined circular shape. Therefore, the moving object 1 may travel on the ground surface in the state illustrated in FIG. 7.

In contrast, when the moving object 1 according to embodiments of the present disclosure passes over stepped portions such as stairs, the wheel frame unit 100 of the wheel 10 has a shape similar to a human leg. Therefore, the moving object 1 may perform the walking motion in the state illustrated in FIG. 8.

The present disclosure has been described with reference to the limited embodiments and the drawings, but the present disclosure is not limited thereby. The present disclosure may be carried out in various forms by those skilled in the art, to which the present disclosure pertains, within the technical spirit of the present disclosure and the scope equivalent to the appended claims.

What is claimed is:

1. A wheel comprising:
a wheel frame unit comprising a plurality of peripheral regions;
a driving power unit disposed at a first side of the wheel frame unit and configured to provide a rotational force that allows the wheel frame unit to perform a rotational motion about a central axis; and
a walking power unit disposed at the first side of the wheel frame unit and configured to provide power that changes relative positions between the plurality of peripheral regions;
wherein the wheel frame unit further comprises extension regions each having one side coupled to the walking power unit and extending from one side thereof in a radial direction of the wheel frame unit; and
wherein the peripheral regions comprise first peripheral regions each having one side fixedly coupled to one of the extension regions, respectively and second peripheral regions each having one side rotatably coupled to one of the extension regions or one of the first peripheral regions.

2. The wheel of claim 1, wherein each of the second peripheral regions is coupled to one of the extension regions or one of the first peripheral regions, respectively, and is configured to be rotatable about a rotation axis defined in a direction intersecting the radial direction.

3. The wheel of claim 1, wherein one side of the extension regions is coupled to the walking power unit on the central axis, and the walking power unit is configured to rotate the extension regions about the central axis.

4. The wheel of claim 3, wherein:

the extension regions comprise first and second extension regions provided separately;

one side of the first extension region and one side of the second extension region are coupled to the walking power unit on the central axis; and the walking power unit is configured to rotate the first and second extension regions in opposite directions about the central axis.

5. The wheel of claim 4, wherein the first peripheral regions comprise:

a first-first peripheral region having a shape of an arc and fixedly coupled to the first extension region; and a first-second peripheral region having the shape of the arc and fixedly coupled to the second extension region.

6. The wheel of claim 5, wherein the first-first peripheral region and the first-second peripheral region have shapes corresponding to each other when the wheel frame unit is viewed in a direction in which the central axis extends.

7. The wheel of claim 5, wherein the first extension region and the first-first peripheral region are integrated, and wherein the second extension region and the first-second peripheral region are integrated.

8. The wheel of claim 5, wherein the second peripheral regions comprise:

a second-first peripheral region having the shape of the arc and rotatably coupled to the first extension region or the first-first peripheral region; and a second-second peripheral region having the shape of the arc and rotatably coupled to the second extension region or the second-first peripheral region.

9. The wheel of claim 8, wherein a region of the second-first peripheral region, which is rotatably coupled to the first extension region or the first-first peripheral region, is defined within a width of the first extension region in a circumferential direction, and wherein a region of the second-second peripheral region, which is rotatably coupled to the second extension region or the first-second peripheral region, is defined within a width of the second extension region in the circumferential direction.

10. The wheel of claim 8, wherein the peripheral regions further comprise a third peripheral region having the shape of the arc and configured such that the second-first peripheral region and the second-second peripheral region are rotatably coupled to the third peripheral region.

11. The wheel of claim 10, wherein a combination of the first-first peripheral region, the first-second peripheral region, the second-first peripheral region, the second-second peripheral region, and the third peripheral region corresponds to a predetermined circular shape.

12. The wheel of claim 10, wherein a first region, in which the second-first peripheral region is rotatably coupled to the third peripheral region, and a second region, in which the second-second peripheral region is rotatably coupled to the third peripheral region, overlap each other when the wheel frame unit is viewed in a direction in which the central axis extends.

13. The wheel of claim 10, wherein a sum of a central angle of the arc of the first-first peripheral region and a central angle of the arc of the first-second peripheral region corresponds to 180 degrees, and wherein a sum of a central angle of the arc of the second-first peripheral region, a central angle of the arc of the second-second peripheral region, and a central angle of the arc of the third peripheral region corresponds to 180 degrees.

14. The wheel of claim 8, wherein the second-first peripheral region and the second-second peripheral region have shapes corresponding to each other when the wheel frame unit is viewed in a direction in which the central axis extends.

15. The wheel of claim 4, wherein the first extension region and the second extension region have shapes corresponding to each other when the wheel frame unit is viewed in a direction in which the central axis extends.

16. The wheel of claim 4, wherein the driving power unit is spaced apart from the wheel frame unit in a direction in which the central axis extends, and wherein the walking power unit is disposed between the wheel frame unit and the driving power unit.

17. The wheel of claim 16, wherein the driving power unit comprises a central driving shaft disposed on the same axis as the central axis and configured to rotate, and wherein the walking power unit is relatively fixed and coupled to the central driving shaft.

18. The wheel of claim 17, wherein the walking power unit comprises:

a central walking shaft disposed on the same axis as the central axis, configured to rotate, and relatively fixed and coupled to the central driving shaft; and a differential gear coupled to one side of the central walking shaft;

wherein one side of the first extension region is coupled to a first side of the differential gear; and wherein one side of the second extension region is coupled to a second side of the differential gear.

19. A moving object comprising:

a body unit; and a wheel mounted on the body unit, wherein the wheel comprises:

a wheel frame unit comprising a plurality of peripheral regions;

a driving power unit disposed at a first side of the wheel frame unit and configured to provide a rotational force that allows the wheel frame unit to perform a rotational motion about a central axis; and a walking power unit disposed at the first side of the wheel frame unit and configured to provide power that changes relative positions between the plurality of peripheral regions;

wherein the wheel frame unit further comprises extension regions each having one side coupled to the walking power unit and extending from one side thereof in a radial direction of the wheel frame unit; and wherein the peripheral regions comprise first peripheral regions, each having one side fixedly coupled to one of the extension regions, respectively, and second peripheral regions, each having one side rotatably coupled to one of the extension regions or one of the first peripheral regions, respectively.

20. A moving object comprising:

a body unit; and a wheel mounted on the body unit, wherein the wheel comprises:

a wheel frame unit comprising a plurality of peripheral regions;

a driving power unit disposed at a first side of the wheel frame unit and configured to provide a rotational force that allows the wheel frame unit to perform a rotational motion about a central axis; and a walking power unit disposed at the first side of the wheel frame unit and configured to provide power that changes relative positions between the plurality of peripheral regions;

wherein the wheel frame unit further comprises extension regions each having one side coupled to the walking power unit and extending from one side thereof in a radial direction of the wheel frame unit;

wherein the peripheral regions comprise first peripheral regions, each having one side fixedly coupled to one of the extension regions, respectively, and second peripheral regions, each having one side rotatably coupled to one of the extension regions or one of the first peripheral regions;

wherein one side of the extension regions is coupled to the walking power unit on the central axis; and wherein the walking power unit is configured to rotate the extension regions about the central axis.

* * * * *